(12) United States Patent
Nentwig

(10) Patent No.: US 9,462,487 B2
(45) Date of Patent: Oct. 4, 2016

(54) METHOD AND APPARATUS FOR ADJACENT CHANNEL EMISSION LIMIT

(75) Inventor: Markus Nentwig, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 283 days.

(21) Appl. No.: 13/878,427

(22) PCT Filed: Oct. 20, 2010

(86) PCT No.: PCT/IB2010/054738
§ 371 (c)(1),
(2), (4) Date: Jun. 18, 2013

(87) PCT Pub. No.: WO2012/052804
PCT Pub. Date: Apr. 26, 2012

(65) Prior Publication Data
US 2013/0260809 A1   Oct. 3, 2013

(51) Int. Cl.
*H04W 24/02* (2009.01)
*H04L 27/26* (2006.01)

(52) U.S. Cl.
CPC .......... *H04W 24/02* (2013.01); *H04L 27/2646* (2013.01); *H04L 27/2655* (2013.01)

(58) Field of Classification Search
CPC .... H04B 7/0891; H04B 17/354; H04B 1/44; H04B 1/525; H04W 24/02; H04W 24/08; H04W 56/001; H04W 56/0085
See application file for complete search history.

(56) References Cited

U.S. PATENT DOCUMENTS

| | | | |
|---|---|---|---|
| 2007/0140101 A1* | 6/2007 | Guo | H04L 27/2618 370/204 |
| 2008/0002645 A1* | 1/2008 | Seki | H04L 25/03834 370/338 |
| 2009/0103645 A1* | 4/2009 | Jitsukawa | H04L 27/2607 375/260 |
| 2009/0170542 A1 | 7/2009 | Chen | |
| 2010/0008217 A1 | 1/2010 | Ding | |
| 2010/0329373 A1* | 12/2010 | Kameya | H04L 27/2678 375/260 |
| 2011/0111710 A1* | 5/2011 | Nentwig | H04B 1/04 455/119 |
| 2012/0322484 A1* | 12/2012 | Yu | H04W 4/08 455/509 |

FOREIGN PATENT DOCUMENTS

WO   WO 2005/036791 A1   4/2005
WO   WO 2008/118081 A2   10/2008

OTHER PUBLICATIONS

Office Action mailed Mar. 10, 2016, issued in related U.S. Appl. No. 13/701,393.
Pekka Janis et al., "Optimizing Spectral Shape Under General Spectrum Emission Mask Constraints", IEEE 2009, pp. 107-111.
International Search Report dated Jun. 1, 2011 corresponding to International Patent Application No. PCT/IB2010/054738.

* cited by examiner

*Primary Examiner* — Bobbak Safaipour
(74) *Attorney, Agent, or Firm* — Squire Patton Boggs (US) LLP

(57) ABSTRACT

In accordance with an example embodiment of the present invention, an apparatus comprises a transceiver configured to receive a transmission signal from a radio node; a processor configured to, based on the received transmission signal, determine membership of the apparatus and the radio node in a common synchronization group and based at least in part on the determination, adjusting at least one transmission parameter.

18 Claims, 5 Drawing Sheets

METHOD AND APPARATUS FOR ADJACENT CHANNEL EMISSION LIMIT

TECHNICAL FIELD

The present application relates generally to a method and apparatus for adjacent-channel emission limit.

BACKGROUND

Wireless local area optimized (OLA) radio systems are envisioned to provide additional capacity, in selected areas such as office or home environments, to cellular systems such as a Long Term Evolution (LTE) system. In such radio systems, due to the small size of radio cells and the resulting high number of access points, conventional network planning is not suitable. Instead, the radio system is expected to be self-organizing or optimizing.

SUMMARY

Various aspects of examples of the invention are set out in the claims.

According to a first aspect of the present invention, an apparatus comprises a transceiver configured to receive a transmission signal from a radio node; a processor configured to, based on the received transmission signal, determine membership of the apparatus and the radio node in a common synchronization group and based at least in part on the determination, adjusting at least one transmission parameter.

According to a second aspect of the present invention, a method comprises at a first node receiving a transmission signal from a second node, based on the received transmission signal, determining membership of the first and second nodes in a common synchronization group; and based at least in part on the determination, adjusting at least one transmission parameter.

According to a third aspect of the present invention, an apparatus comprises at least one processor; and at least one memory including computer program code. The at least one memory and the computer program code configured to, with the at least one processor, cause the apparatus to perform at least the following: receiving a transmission signal from a radio node; based on the received transmission signal, determining membership of the apparatus and the radio node in a common synchronization group; and based at least in part on the determination, adjusting at least one transmission parameter.

According to a fourth aspect of the present invention, an apparatus comprises means for receiving a transmission signal from a radio node. Means for determining membership of the apparatus and the radio node in a common synchronization group based on the received transmission signal; and based at least in part on the determination, means for adjusting at least one transmission parameter.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 8 of the drawings.

Figure 1:
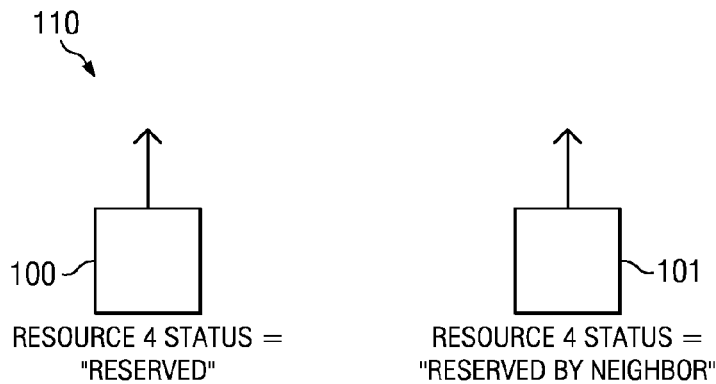
FIG. 1 illustrates an example of a reservation of a radio resource by a radio node in a wireless system in accordance with an example embodiment of the invention.

FIG. 1 illustrates an example of a reservation of a radio resource by a radio node in a wireless system 110 in accordance with an example embodiment of the invention. The wireless system 110 includes two neighboring radio nodes 100 and 101, accessing a shared medium divided into radio resources. For example, a radio resource may be a frequency subband and/or a channel. Other types of radio resources are for example time slots in a periodic frame structure, a set of orthogonal codewords or a combination thereof. The radio node may also be referred to, without a loss of generality, as a node.

Radio node 100 may use one radio resource identified as r=4. Simultaneous use of the same resource, r=4, by other radio nodes such as radio node 101, for example by transmitting, may cause intolerable interference to radio node 100. Therefore, radio node 100 may acquire a reservation on a radio resource. A reservation limits transmit activity by neighboring radio nodes on the radio resource and thus prevents causing intolerable interference to radio node 100. Hence, FIG. 1 illustrates radio node 100, holding a reservation on radio resource r=4. Further, it shows radio node 101 that is aware of a neighboring radio node reserving resource r=4.

In an example embodiment, a reservation may be assigned by a network operator or a managing entity such as a support radio node.

In another embodiment, reservations are acquired dynamically based at least in part on the availability of radio resources and depending on traffic volume. For example, radio node 100 may sense for beacon signals from other radio nodes transmitted on resource r=4. Detecting none, radio node 100 may consider resource r=4 as free, and reserve it for its own use. Having reserved the resource, radio node 100 may transmit a beacon signal comprising a reservation signal on the radio resource, indicating the reservation to neighboring radio nodes.

Emissions from a radio transmitter are allowed within an assigned frequency band within the bandwidth and tolerance for the frequency band. Emissions which do not meet technical parameters are unwanted emissions comprising spurious emissions and out-of band emissions. Reservations control the maximum amount of emitted power generated by a radio node on a radio resource. For example, radio node 101 in FIG. 1 may be allowed to emit a power of up to 21 dBm on resource r=5, while it holds a reservation on resource r=5 granting it the right to transmit. Radio node 101 may be required to limit its emissions to no more than −19 dBm on resource r=4, because neighboring radio node 100 holds a reservation, and a transmission at a higher level by radio node 101 would cause intolerable interference to reception at radio node 100.

The emission limit to radio node 101 on the radio resource may be chosen to allow radio node 101 to transmit at a very low power on resource r=4 that causes no intolerable interference to the reserving radio node 100. The emission limit may also allow unwanted emissions from radio node 101 into the radio resource. Unwanted emissions may result for example by noise or through distortions caused by various components of the radio system such as amplifier distortion, when transmitting on another resource, such as r=5. Another source of unwanted emissions from a transmitter is sinc leakage. For example, in orthogonal frequency division multiplex (OFDM), orthogonal frequency division multiple access signal (OFDMA) or single-carrier frequency division multiple access (SC-FDMA), sinc leakage results from the discontinuity between adjacent symbols. In the wireless system 110 of FIG. 1, radio nodes 100 and 101 may use an OFDM radio scheme to communicate and share radio resources.

Figure 2:
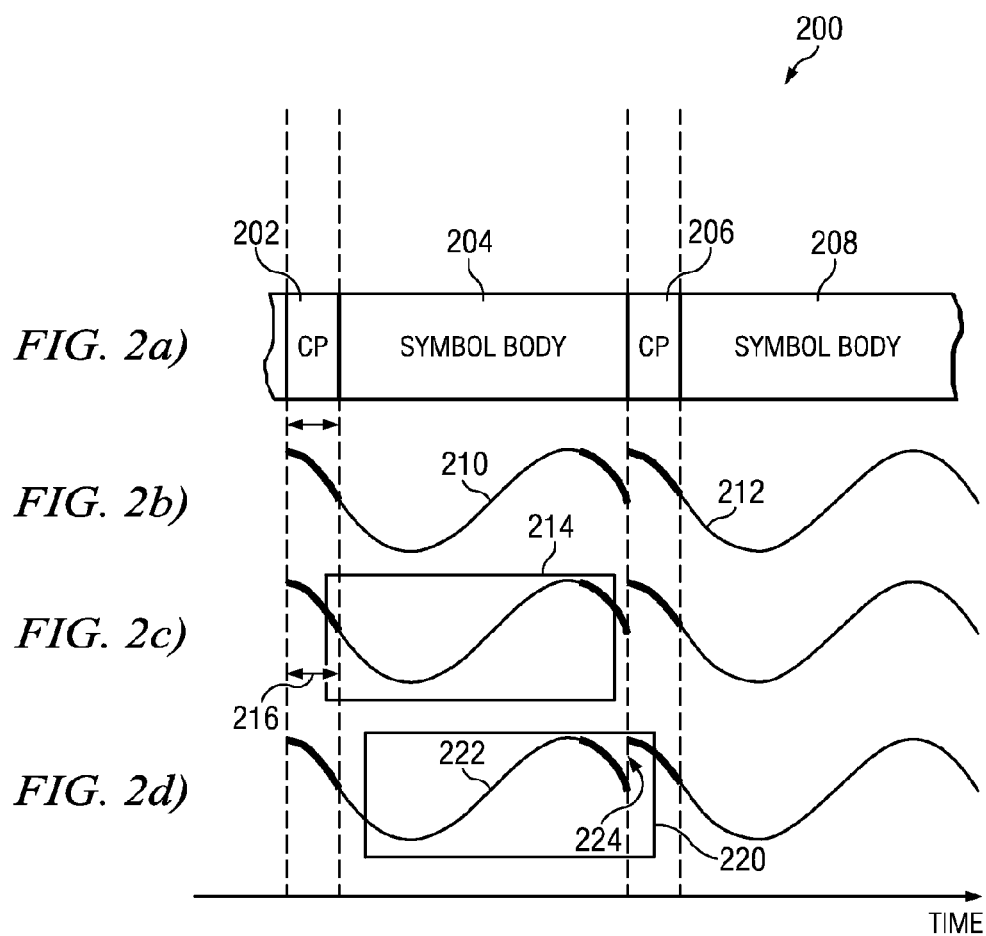
FIG. 2 illustrates example orthogonal frequency division multiplex (OFDM) symbols and a time domain waveform of a subcarrier in the OFDM symbol on a time axis in accordance with an example embodiment of the invention.

FIG. 2 illustrates example OFDM symbols and a time domain waveform of a subcarrier 200 in the OFDM symbols on a time axis as transmitted by radio nodes 100 and 101 of FIG. 1 in accordance with an example embodiment of the invention.

FIG. 2a shows the symbol structure of an OFDM transmission. Each symbol body 204, 208 is preceded by a cyclic prefix (CP) 202, 206 respectively. CP 202 replicates at least a portion of the end of the symbol body 204 and CP 206 replicates at least a portion of the end of the symbol body 208.

FIG. 2b shows time domain waveforms 210, 212 of a subcarrier in the
OFDM symbols.

FIG. 2c shows a time aperture 214 of a receiver radio node that is synchronized with the transmission within the duration of a cyclic prefix (CP) 216. The waveform of the subcarrier is continuous within time aperture 214.

FIG. 2d shows a time aperture 220 of a receiver that is not synchronized with the transmission. The waveform of the subcarrier 222 exhibits a discontinuity 224 within the time aperture 220. The discontinuity results in the leakage of energy from the subcarrier to subcarriers on other frequencies and appears as unwanted emissions.

A receiver that is synchronized with the transmission is able to periodically expand each received OFDM symbol which is implicitly done in the Fast Fourier Transform (FFT) processing. As a result, for a receiver that is synchronized with the transmission, the sinc-spectrum from any nearby out-of-band subcarrier disappears. This does not hold for an unsynchronized receiver. For an unsynchronized receiver the discontinuity between any two OFDM symbols falls into the FFT window and causes subcarrier leakage into adjacent frequency bands.

Figure 3:
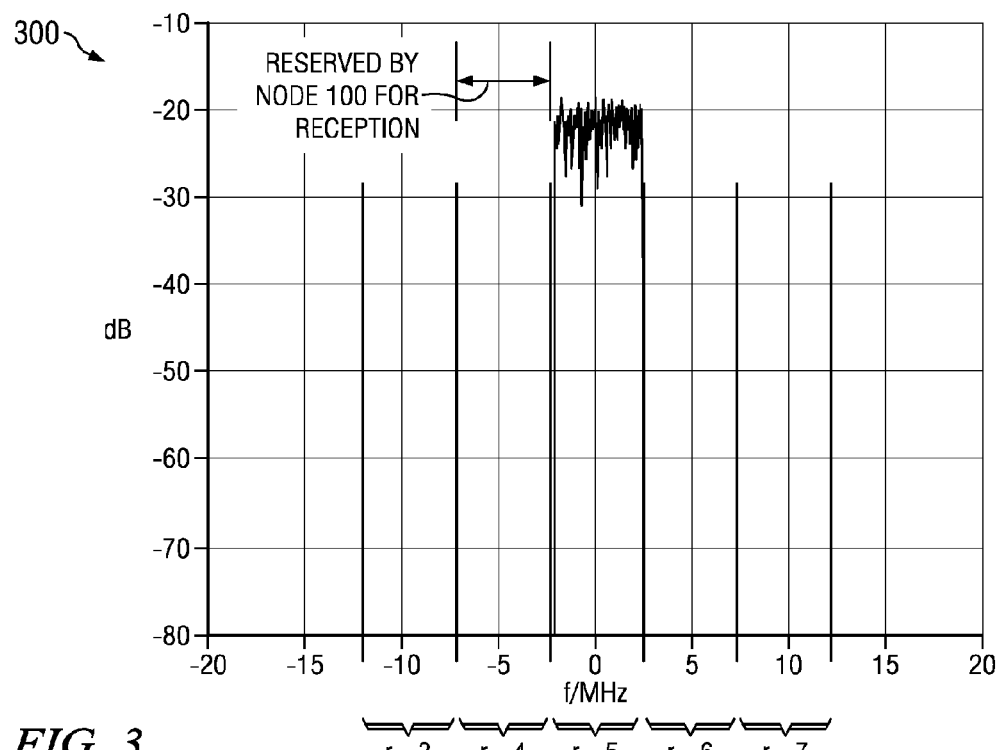
FIG. 3 illustrates an example spectrum of an OFDM signal received with a synchronized radio node in accordance with an example embodiment of the invention.

FIG. 3 illustrates an example spectrum of an OFDM signal 300, as illustrated in FIG. 2c, received with a synchronized radio node in accordance with an example embodiment of the invention. The transmitter, for example radio node 101 of FIG. 1, uses a radio resource corresponding to a 5 MHz subband marked as "r=5". For an ideal transmitter, no other emissions are created into adjacent and nearby subbands r=3, r=4, r=6 and r=7.

Figure 4:
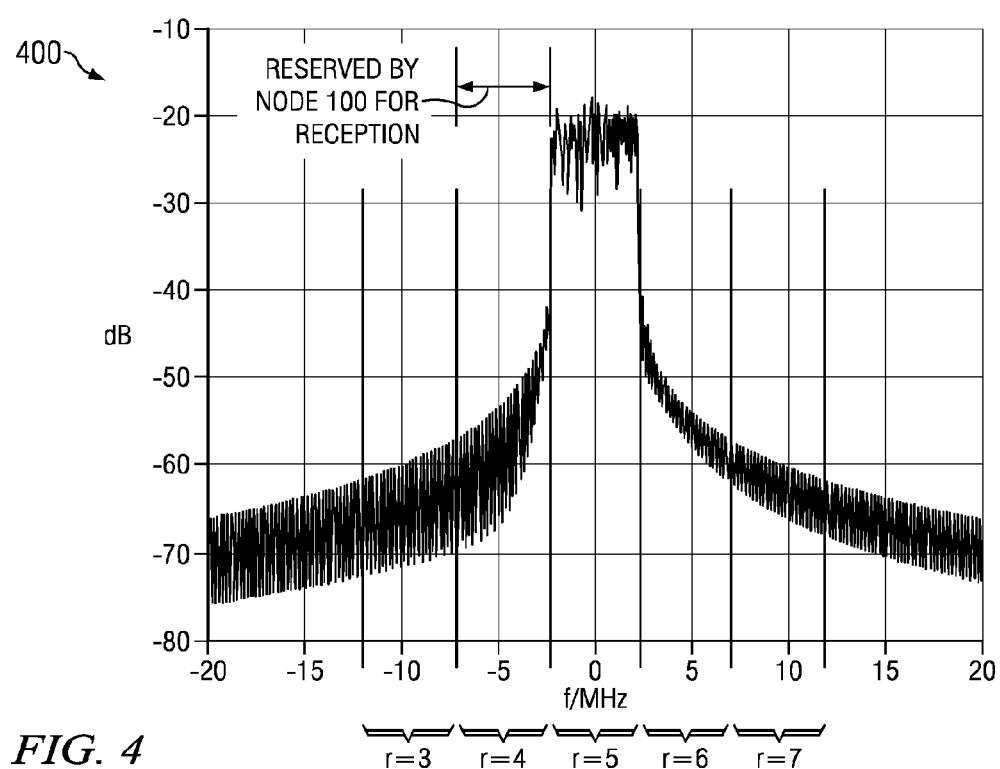
FIG. 4 illustrates an example spectrum of an OFDM signal received with an unsynchronized radio node in accordance with an example embodiment of the invention.

FIG. 4 illustrates an example spectrum of an OFDM signal 400, as illustrated in FIG. 2d, received with an unsynchronized radio node in accordance with an example embodiment of the invention. The transmitter, for example radio node 101 of FIG. 1, uses a radio resource corresponding to a 5 MHz subband marked as "r=5". Unsynchronized reception causes sinc leakage that results in energy leaking from the transmission in subband r32 5 into adjacent subbands r=4, r=6 and to a lesser extent into nearby subbands r=3, r=7 and other frequency regions. For example, the amount of sinc leakage into subbands r=4, r=6 may be 30 dB below the transmit power in subband r=5 (−30 dBc). The sinc leakage into subbands r=3, r=7 may be −35 dBc.

As can be seen from FIGS. 3 and 4, the amount of interference caused by radio node 101 transmitting in resource r=5 may cause interference to reception at radio node 100 in resource r=4. The interference may depend on the state of synchronization between transmitter radio node 101 and receiver radio node 100.

Determining a state of synchronization with a neighboring node may be done in several ways. For example, radio node 101 may receive a synchronization signal from radio node 100 of wireless system 110 and calculate a timing offset. The timing offset may indicate the reception time of a transmission from radio node 100 arriving at radio node 101, relative to the OFDM symbol timing of radio node 100. Based on the timing offset, radio node 101 may determine neighboring radio node 100 as a synchronized or unsynchronized radio node. Periodically, the synchronization status is monitored to ensure it is maintained. For example, to monitor a state of synchronization with a neighboring node, a radio node may periodically interrupt reception, synchronize the OFDM receiver to the neighboring node and thereby obtain neighbor's symbol timing and determine the state of synchronization based on neighbor's symbol timing. If each radio node has several neighboring nodes, the effort of synchronizing and monitoring a state of synchronization multiplies and considerable resources are dedicated for such purpose.

A technical effect of one or more embodiments disclosed herein is to limit interference to a neighboring node without performing a full synchronization or constantly monitoring the state of synchronization.

In an example embodiment, several radio nodes are managed by a coordinating entity. For example a coordinating entity may manage a plurality of access points (APs) of a corporate network in one office building, may be tasked to balance load/traffic, support handovers between APs of the same network and/or it may control access to a closed subscriber group.

Figure 5:
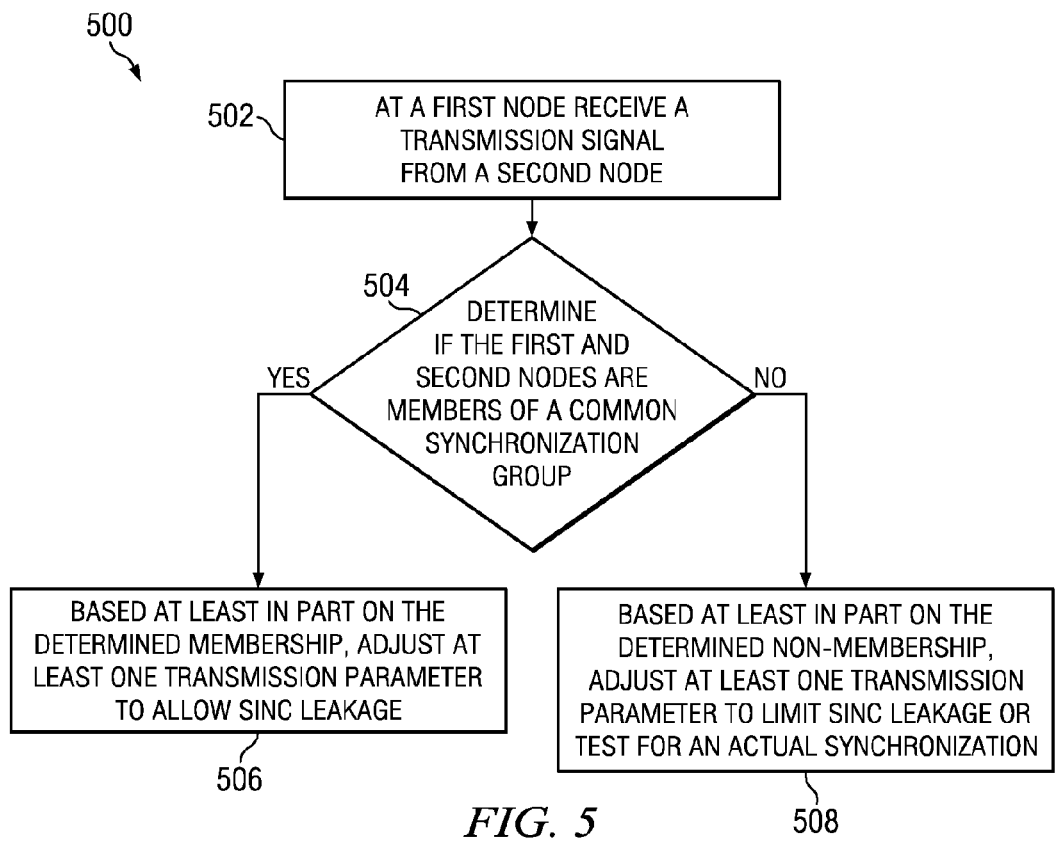
FIG. 5 illustrates an example method for channel emission limit in accordance with an example embodiment of the invention.

FIG. 5 illustrates an example method 500 for channel emission limit in accordance with an example embodiment of the invention. The channel emission limit described by method 500 is based on membership of a first and a second node in a common synchronization group. In discussing method 500 references would be made to FIG. 1 but the method can also be performed by any of the APs or mobile radio nodes in FIGS. 6A, 6B and 7 to be discussed hereinafter. Method 500 may be executed by radio node 101 of wireless system 110 of FIG. 1. The radio node executing the process may be aware of a transmission signal by another radio node, such as radio node 100 of wireless system 110 of FIG. 1.

The method 500 comprises receiving a transmission signal at block 502, for example from radio node 100 of wireless system 110. In accordance with an example embodiment of the invention, the transmission signal is at least one of a broadcast signal, a synchronization signal, a reservation signal, a pilot signal, a preamble, a beacon signal, a power envelope, a predefined waveform and/or the like. In accordance with an example embodiment of the invention a broadcast signal may comprise a broadcast reservation signal indicating desire to reserve a radio resource for reception.

In accordance with an example embodiment of the invention, the transmission signal comprises a node identity (ID). The ID identifies the transmitting radio node as a member of a synchronization group. In an example embodiment, the ID may be part of a set of known identities in a network which identify each radio node in the network belonging to a synchronization group.

In another example embodiment, the set of known identities may comprise a single group identity which identifies those radio nodes members belonging to a common or same synchronization group. In another example embodiment, the set of known identities or single group identity are configured by a managing entity. In another example embodiment, the ID may represent the identity of a supporting radio node, for example an access point (AP), and the ID is configured to another radio node served by the AP.

The method 500 further comprises determining at block 504 if radio nodes 100 and 101, of wireless system 110 of FIG. 1, are members of a common or the same synchronization group. In accordance with an example embodiment of the invention, determining membership in a synchronization group comprises determining whether radio nodes 100 and 101 are associated or served by the same AP and have the same ID as provided to them by the AP. In another example embodiment, determining membership in a common synchronization group comprises comparing the received ID of radio node 100 against a set of known identities provided to radio node 101 by the AP. In another example embodiment, determining membership in a common synchronization group comprises comparing if radio nodes 100 and 101 have the same single group identity.

If at block 504, it is determined that radio nodes 100 and 101 of wireless system 110 of FIG. 1 are members of a common or the same synchronization group the process continues to block 506. Otherwise, the process continues to block 508.

Based on the determined membership of radio node 100 and 101 in a common synchronization group, at block 506, method 500 further comprises adjusting at least one transmission parameter by radio node 101 of wireless system 110 of FIG. 1 to allow sinc leakage. If it is determined that radio nodes 100 and 101 are members of a common or the same synchronization group, emissions from sinc leakage is disregarded.

In accordance with an example embodiment of the invention, adjusting at least one transmission parameter to allow sinc leakage comprises adjusting at least one transmission parameter such as transmit power, an average magnitude of a set of subcarriers, a number of unused subcarriers at a band edge, a modification scheme applied to an OFDM symbol to achieve continuity of the baseband waveform with an adjacent symbol, filtering, windowing and a number of subcarriers near a band edge with arbitrary content chosen to allow sinc leakage.

An example method for adjusting transmit power is to vary the gain of a transmit amplifier. An example method for adjusting transmission parameter is to modify the spectrum shape of a transmitted OFDM symbol. The spectrum shape of a transmitted OFDM symbol may be modified for example by assigning the same power level to subcarriers used for data transmission in the frequency band.

Another example method for adjusting transmission parameter is to adjust a number of unused subcarriers at a band edge by removing guard bands. Another example method for adjusting transmission parameter is to apply a relaxed time domain windowing on a transmitted OFDM symbol. Yet, another example method for adjusting transmission parameter is to apply a relaxed spectrum shaping filtering. Spectrum shaping filtering may be applied for example by enabling a digital filter on a transmit baseband signal.

Another example method for adjusting transmission parameter is to limit the use of cancellation subcarriers into a transmitted OFDM symbol. Cancellation subcarriers may be reduced by increasing the number of subcarriers used for data transmission.

Adjusting at least one transmission parameters at block 506 for radio node 101 belonging to the same synchronization group as radio node 100 may result in increasing a level of unwanted emissions into a neighboring radio channel, compared to a radio node which is not a member of the same synchronization group. When two radio nodes belong to the same synchronization group the two radio nodes may be considered as synchronized. For a synchronized radio node, transmissions from another synchronized radio node appear confined to the frequency range of utilized subcarriers and the transmission does not cause interference. This does not hold for transmissions from an unsynchronized radio node which causes interference due to sinc-leakage.

If at block 504, it is determined that radio nodes 100 and 101 of wireless system 110 of FIG. 1 are not members of a common or the same synchronization group the process continues to block 508. Based on the determined non-membership of radio nodes 100 and 101 in a common synchronization group, at block 508, method 500 further comprises adjusting at least one transmission parameter by radio node 101 of wireless system 110 of FIG. 1 to limit or prevent sinc leakage. Alternatively, at block 508, nodes 100 and 101 may test for an actual synchronization or temporarily synchronize.

In accordance with an example embodiment of the invention, adjusting at least one transmission parameter to limit or prevent sinc leakage comprises adjusting at least one transmission parameter such as transmit power, an average magnitude of a set of subcarriers, a number of unused subcarriers at a band edge, a modification scheme applied to an OFDM symbol to achieve continuity of the baseband waveform with an adjacent symbol, filtering, windowing and a number of subcarriers near a band edge with arbitrary content chosen to reduce sinc leakage.

An example method for adjusting transmit power is to vary the gain of a transmit amplifier to limit sinc leakage in the adjacent channels. An example method for adjusting transmission parameter is to modify the spectrum shape of a transmitted OFDM symbol. The spectrum shape of a transmitted OFDM symbol may be modified for example by assigning different power levels to subcarriers used for data transmission, depending on a frequency associated with the subcarrier. A subcarrier associated with a frequency closer to the edge of a frequency band associated with an OFDM symbols may be assigned a lower transmit power, compared to a subcarrier associated with a frequency closer to the center of the frequency band.

Another example method for adjusting transmission parameter is to adjust a number of unused subcarriers at a band edge by introducing guard bands. Guard bands may be added for example by reducing the number of subcarriers used for data transmission. Another example method for adjusting transmission parameter is to apply time domain windowing on a transmitted OFDM symbol. Yet, another example method for adjusting transmission parameter is to apply spectrum shaping filtering. Spectrum shaping filtering may be applied for example by enabling a digital filter on a transmit baseband signal.

Another example method for adjusting transmission parameter is to insert cancellation subcarriers into a transmitted OFDM symbol. Cancellation subcarriers may be inserted for example by reducing the number of subcarriers used for data transmission, and assigning a value to subcarriers not used for data transmission that minimizes sinc leakage of the transmitted signal.

Adjusting at least one transmission parameters at block 508 for radio node 101 which is not a member of the same synchronization group as radio node 100 may result in decreasing a level of unwanted emissions into a neighboring radio channel, compared to a radio node member of the same synchronization group. When two radio nodes do not belong to the same synchronization group the two radio nodes may be considered as unsynchronized. Alternatively, at block 508, nodes 100 and 101 may test for an actual synchronization or temporarily synchronize.

Figure 6A:
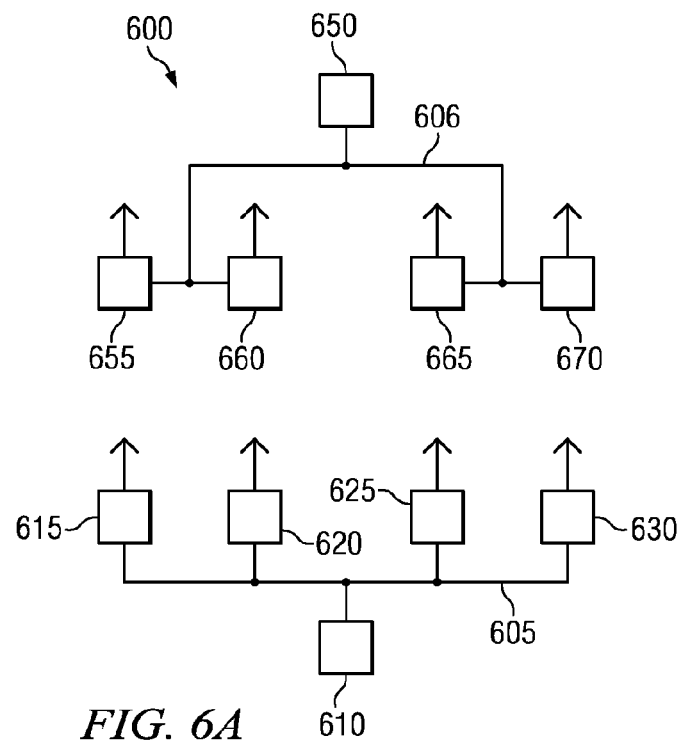
FIG. 6A illustrates an example of a network system in accordance with an example embodiment of the invention.

FIG. 6A illustrates an example of a network system 600 in accordance with an example embodiment of the invention. Network system 600 of FIG. 6A comprises two groups of access points (APs) each managed by one coordinating entity. APs 615, 620, 625 and 630 are managed by coordinating entity 610 and APs 655, 660, 665 and 670 are managed by coordinating entity 650. The combination of APs 615, 620, 625, 630 and coordinating entity 610, and APs 655, 660, 665, 670 and coordinating entity 650 may represent two independent sub-networks, for example networks deployed in nearby buildings.

In an example embodiment, the coordinating entities 610 and 650 may be connected to their respective APs by wired connections 605, 606 respectively. This wired connection may be a cable or fiber optic connection. In another example embodiment, the coordinating entities 610 and 650 may be connected to their respective APs by a wireless connection. In an example embodiment, the wireless connection may be within or outside the frequency band normally used by the APs to communicate with other APs. In another example embodiment, the wireless connection may be within or outside the frequency band used by APs to communicate with mobile radio nodes. In another example embodiment, the wireless connection may be within or outside the frequency band used by two mobile radio nodes engaged in a device to device (D2D) communication.

The coordinating entity 610 may provide synchronization services to APs 615, 620, 625 and 630 by providing a clock signal. Coordinating entity 610 may further configure APs 615, 620, 625 and 630 to receive synchronization signals from each other. APs 615, 620, 625 and 630 may discard any other received synchronization signals such as those from APs 655, 660, 665 and 670. The coordinating entity 650 may provide synchronization services to APs 655, 660, 665 and 670 by providing a clock signal. Coordinating entity 650 may further configure APs 655, 660, 665 and 670 to receive synchronization signals from each other. APs 655, 660, 665 and 670 may discard any other received synchronization signals such as those from APs 615, 620, 625 and 630.

The APs shown in FIG. 6A are devices that allow connection to a wireless network. The APs can establish and maintain communication with mobile radio nodes or other mobile devices and the coordinating entity 610 and 650. In an example embodiment, an AP can be considered to be a node B (NB), an evolved node B (eNB) or a femto cell.

Coordinating entities 610 and 650 are network nodes that connect APs and indirectly mobile radio nodes to another network. In an example embodiment, the coordinating entities 610 and 650 fulfill the role of a gateway and thus enable access to either a private network or to the internet.

In network system 600, every AP may have a unique node identity (ID), for example a medium access control (MAC) address or the node identity (ID) may be assigned by a coordinating entity. In an example embodiment, coordinating entity 610 provides the list of IDs of APs that it currently serves to every connected AP 615, 620, 625 and 630 in its sub-network. In an example embodiment, coordinating entity 650 provides the list of IDs of APs that it currently serves to every connected AP 655, 660, 665 and 670 in its sub-network.

Various examples of using the embodiment described in method 500 will be discussed next without referring to the specific blocks of the method. In accordance with an example embodiment, AP 615 reserves a radio resource R for reception, by transmitting a signal on the radio resource. The transmission signal is at least one of a broadcast signal, a synchronization signal, a reservation signal, a pilot signal, a preamble, a beacon signal, a power envelope and a predefined waveform and/or the like. The transmission signal on the radio resource comprises the node identity (ID) of AP 615. Neighbor AP 620 receives the transmission signal. AP 620 decodes the ID, and finds the received ID in the list provided by its coordinating entity 610. AP 620, based on the received ID, determines membership of AP 615 and itself in a common synchronization group. AP 620, based on the determined membership of AP 615 and itself in a common synchronization group, adjusts its transmission parameters. AP 620 adjusts its transmission parameters on a neighboring radio resource R+1 to allow sinc leakage into resource R.

In another example embodiment, AP 620 receives a transmission signal such as a broadcast reservation signal from AP 655 served by coordinating entity 650. In the broadcast reservation signal, AP 655 reserves a radio resource J for reception. AP 620 decodes the ID, but does not find the received ID in the list provided by its coordinating entity 610. AP 620, based on the received ID, determines that AP 655 and itself do not belong to a common synchronization group. Therefore, AP 620 adjusts its transmission parameters on a neighboring radio resource J+1 to prevent sinc leakage into resource J. Alternatively, AP 620 may test for an actual synchronization or temporarily synchronize with AP 655.

Figure 6B:
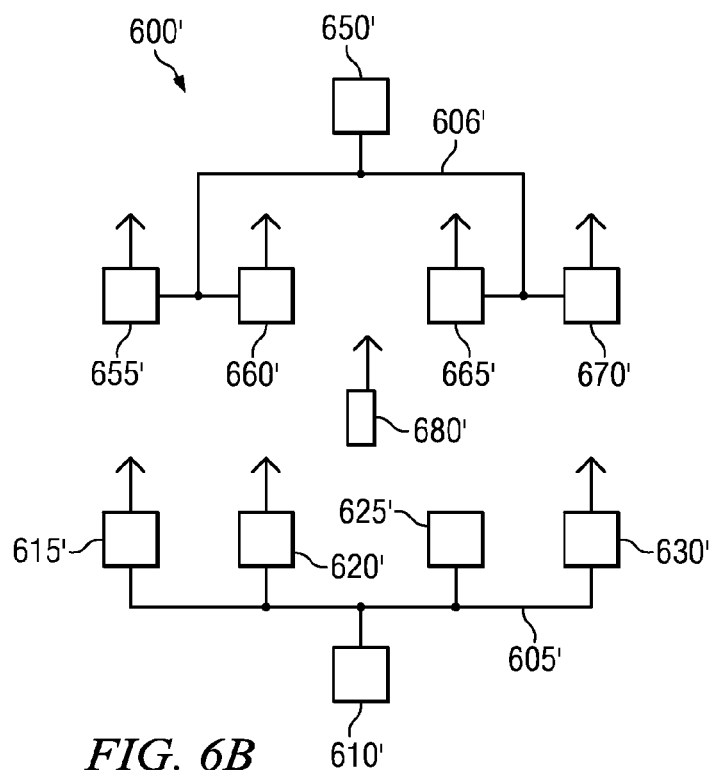
FIG. 6B illustrates an example of a network system in accordance with another example embodiment of the invention.

FIG. 6B illustrates an example of a network system 600' in accordance with another example embodiment of the invention. Network system 600' of FIG. 6B comprises two groups of access points (APs), each managed by one coordinating entity and a mobile radio node 680'. In FIG. 6B, as an example only one mobile radio node is shown but each sub-network may support a plurality of mobile radio nodes. The combination of APs 615', 620', 625', 630' and coordinating entity 610', and APs 655', 660', 665', 670' and coordinating entity 650' may represent two independent sub-networks, for example networks deployed in nearby building. The APs and coordinating entities of network system 600' of FIG. 6B are similar in functionality to those described in network system 600 of FIG. 6A. Hereinafter the distinguishing factor characterizing network system 600' of FIG. 6B will be discussed.

In an example embodiment, each AP 615', 620', 625', 630' and 655', 660', 665' and 670' transmits a reservation for reception on a radio resource. When mobile radio node 680' is powered on, initially, mobile radio node 680' is not associated with any AP. It therefore treats all APs as unsynchronized. If mobile radio node 680' has access rights to the sub-network 615', 620', 625', 630', it may contact the AP with the best channel condition, for example AP 620', on a random access channel, and set up a connection. During connection setup, AP 620' provides its ID to mobile radio node 680'.

Mobile radio node 680' may establish a reservation for reception on a radio resource. Mobile radio node 680' may do so by transmitting a broadcast reservation signal on a radio resource P using the ID of its serving AP 620'. APs 655', 660', 665' and 670', belonging to a different sub-network, may receive the broadcast reservation signal from mobile radio node 680'. APs 655', 660', 665' and 670' decode the ID from the received broadcast reservation signal. APs 655', 660', 665' and 670' do not find the decoded ID in their list and each determines that mobile radio node 680' and itself do not belong to a common synchronization group. Hence, APs 655', 660', 665' and 670' treat mobile radio node 680' as unsynchronized neighbor. Therefore, APs 655', 660', 665', 670' adjust their transmission parameters on a neighboring radio resource P+1 to prevent sinc leakage into resource P. Alternatively, APs 655', 660', 665', 670' may each test for an actual synchronization or temporarily synchronize with mobile radio node 680'. APs 615', 620', 625' and 630' may receive the same broadcast reservation signal from mobile radio node 680', and find the ID encoded into the broadcast reservation signal by mobile radio node 680' in the member list. Based on the found ID, each AP 615', 620', 625' and 630' may determine that mobile radio node 680' and itself do belong to a common synchronization group and hence treat mobile radio node 680' as a synchronized neighbor. Therefore, APs 615', 620', 625' and 630' adjust their transmission parameters on a neighboring radio resource P+1 to allow sinc leakage into resource P.

In an example embodiment, mobile radio node 680' may receive a broadcast reservation signal from a radio node reserving a radio resource Q. The radio node may be for example an AP or another mobile radio node in the network. The broadcast reservation signal may comprise an encoded ID, and mobile radio node 680' may decode the ID. Mobile radio node 680' may receive and store a list of valid IDs. The list of valid IDs may be provided by AP 620', for example following connection setup between mobile radio node 680' and AP 620'. Mobile radio node 680' may determine common membership with the reserving radio node by looking up the decoded ID from the list of valid IDs. If the decoded ID is found from the list, mobile radio node 680' may determine membership in a common synchronization group with the reserving node. Mobile radio node 680' may also signal the decoded ID to AP 620' and request to determine, whether or not mobile radio node 680' and the reserving node are member in a common synchronization group. If membership in a common synchronization group is determined, mobile radio node 680' may adjust transmission parameters to allow sinc leakage into an adjacent radio resource Q+1. If no membership in a common synchronization group is determined, mobile radio node 680' may adjust transmission parameters to reduce sinc leakage into an adjacent radio resource Q+1. Alternatively, mobile radio node 680' may test for an actual synchronization or temporarily synchronize with the broadcasting AP or other mobile radio node.

Figure 7:
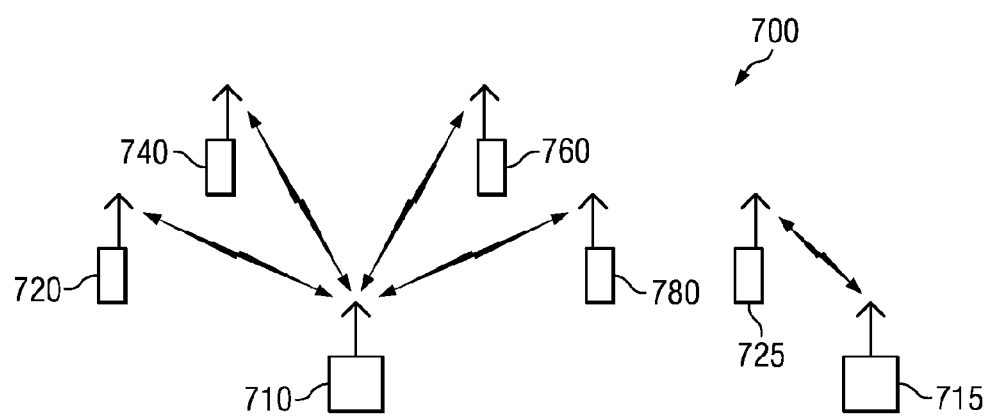
FIG. 7 illustrates an example of a network system in accordance with yet another example embodiment of the invention.

FIG. 7 illustrates an example of a network system 700, in accordance with yet another example embodiment of the invention. Network system 700 comprises a group of mobile radio nodes managed by two APs but with no coordinating entity. Mobile radio nodes 720, 740, 760 and 780 are managed by AP 710 and mobile radio node 725 is managed by AP 715. Each AP 710, 715 assigns its ID to the connected mobile radio nodes.

In an example embodiment, each mobile radio node transmits reservation messages on a radio resource using the ID of its serving AP. Mobile radio node 780 receives a broadcast reservation signal from mobile radio node 760 and it may compare the received ID to the one it got from its serving AP 710. Since the two IDs match, mobile radio node 780 determines that mobile radio node 760 and itself are members of a common synchronization group and hence treats mobile radio node 760 as a synchronized neighbor. Therefore, mobile radio node 780 adjusts its transmission parameters on neighboring radio resources to allow sinc leakage into radio resources reserved by mobile radio node 760.

Mobile radio node 780, served by AP 710, may receive a broadcast reservation signal from mobile radio node 725. Since mobile radio node 725 is served by AP 715, mobile radio node 780 determines that the ID in the received broadcast reservation signal from mobile radio node 725 does not match the ID of its serving AP 710. Thus, mobile radio node 780 determines that mobile radio node 725 and itself are not members of a common synchronization group and hence treats mobile radio node 725 as an unsynchronized neighbor. Therefore, mobile radio node 780 adjusts its transmission parameters on neighboring radio resources to prevent sinc leakage. Alternatively, mobile radio node 780 may test for an actual synchronization or temporarily synchronize with the mobile radio node 725. The same example embodiment would apply for a broadcast reservation signal from AP 715 that is received by mobile radio node 780. The same example embodiment also applies for a broadcast reservation signal of mobile radio node 725 or AP 715 that is received by AP 710, where AP 710 compares the received ID to its own ID.

Referring to FIG. 6A or 6B, in an example embodiment, coordinating entities 610, 610' and 650, 650' may each assign a group ID to their respective APs. Each AP in turn assigns the group ID to all connected mobile radio nodes. In an example embodiment, an AP or a mobile radio node broadcasting a reservation ("neighbor node") encodes the group ID into the reservation. When another node such as an AP or a mobile radio node ("receiving node"), belonging to the same sub-network as the neighboring node, receives a broadcast reservation signal from a neighbor node, the receiving node compares the receiving node's own group ID with the group ID encoded into the reservation. The receiving node determines membership in a common synchronization group with the neighbor node, if the group IDs match. If membership in a common synchronization group is determined, the receiving node adjusts its transmission parameters to allow sinc leakage into the radio resource reserved by the neighbor node. If membership in a common synchronization group is not determined, the receiving node adjusts its transmission parameters to prevent sinc leakage into the radio resource reserved by the neighbor node.

In another example embodiment, AP 710 and 715 of FIG. 7 may assign a unique group ID to their respective mobile radio nodes and follow the same process as described in section [0066]. Alternatively, where no common membership in a synchronization group is determined the AP or mobile radio node may test for an actual synchronization or temporarily synchronize with the broadcasting party.

Figure 8:
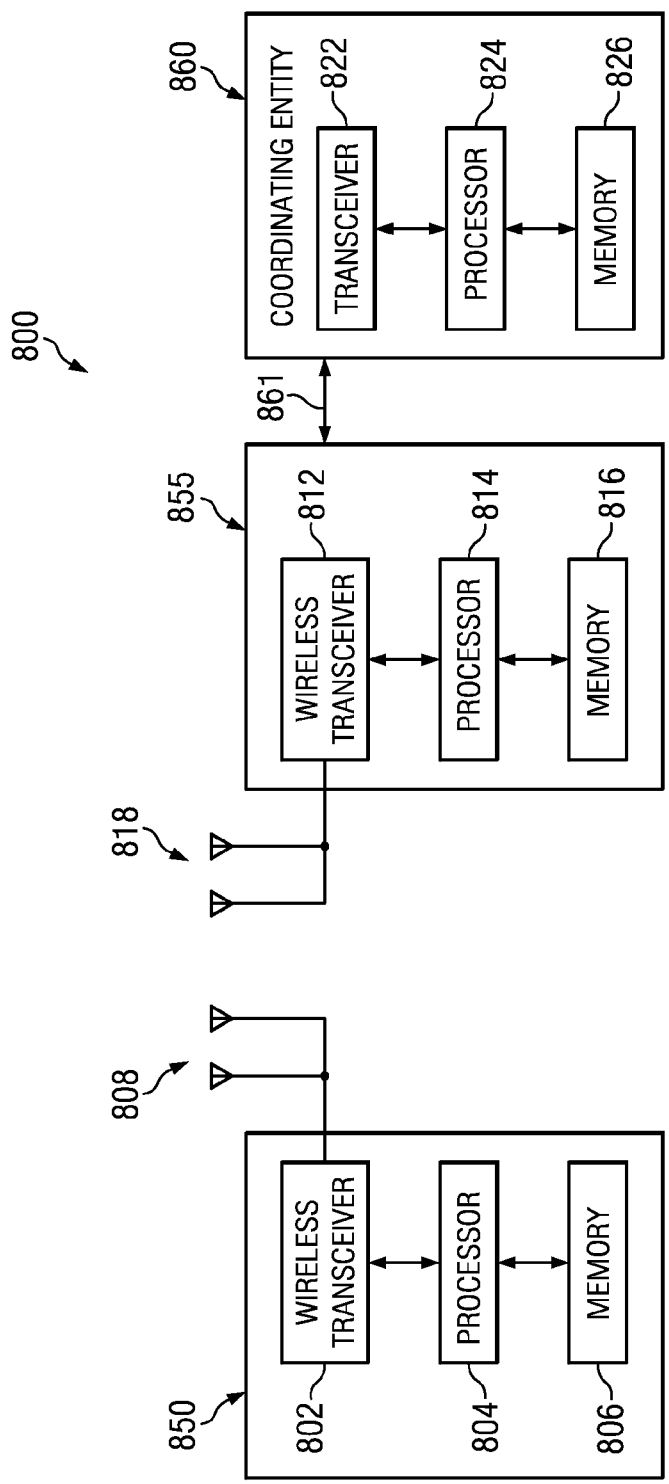
FIG. 8 illustrates an example of a wireless communication network in accordance with an example embodiment of the invention.

FIG. 8 illustrates an example of a wireless communication network 800 in accordance with an example embodiment of the invention. The example wireless communication network 800 comprises a coordinating entity 860, radio node 855 also referred to as access point (AP) and mobile radio node 850 suitable for use in practicing the example embodiments of this invention. The wireless communication network may comprise multiple coordinating entities each managing multiple APs. Each AP 855 may in turn serve multiple mobile radio nodes and each coordinating entity 860 may serve multiple access points.

Coordinating entity 860 illustrates a simplified block diagram of the coordinating entity described in FIG. 6A and 6B, that are suitable for use in practicing the example embodiments of this invention. Coordinating entity 860 may include a processor 824, a memory 826 coupled to the processor 824, and a suitable transceiver 822 coupled to the processor 824. The coordinating entity 860 is coupled via a data path 861 to AP 855.

The transceiver 822 may comprise multiple transceivers for bidirectional communications with at least one AP. The bidirectional communication may occur through a wired or a wireless connection. For wireless communication, the coordinating entity 860 includes single or multiple antennae, not shown, for establishing the wireless connection. The processor 824 is configured to assign IDs to each APs. Processor 824 may be tasked to manage the resources assigned to each AP. The memory 826 may be used to store the set of known IDs or group ID assigned by the coordinating entity 860 which identify members of the common synchronization group.

Access point 855 illustrates a simplified block diagram of the APs described in FIG. 1, 6A, 6B and 7 that are suitable for use in practicing the example embodiments of this invention. AP 855 may include a processor 814, a memory 816 coupled to the processor 814, and a suitable transceiver 812 coupled to the processor 814.

The transceiver 812 may comprise multiple transceivers for bidirectional communications with a coordinating entity 860 and for wireless communication with multiple mobile radio nodes and other APs. The processor 814 is configured to manage resources, communication with coordinating entity 860 and communication with each radio mobile served by the AP. The memory 816 may be used to store the ID, set of known IDs or group ID provided by the coordinating entity 860, which identify members of the common synchronization group.

Mobile radio node 850 illustrates a simplified block diagram of the mobile radio nodes described in FIG. 1, 6B and 7 that are suitable for use in practicing the example embodiments of this invention. Mobile radio node 850 may include a processor 804, a memory 806 coupled to the processor 804, and a suitable transceiver 802 coupled to the processor 804.

The transceiver 802 may comprise multiple transceivers for bidirectional communications with AP 855 and with or other mobile radio nodes. The processor 804 is configured to manage resources and coordinate communication with AP 855 and other radio mobile nodes. The memory 806 is used to store the ID, set of known IDs or group ID provided by the serving AP which identify members of the common synchronization group.

The wireless transceivers 802, 812 are for bidirectional wireless communications with another wireless device and include functionality to receive transmission signal. The wireless transceivers 802, 812 may be configured with multiple transceivers including multiple antennas 808, 818. The wireless transceivers 802, 812 may provide frequency shifting, converting received RF signals to an intermediate frequency or baseband and converting intermediate frequency or baseband transmit signals to RF. The wireless transceivers 802, 812 may convert received RF signals to digital signals, and/or digital signals to transmitted RF signals. In some descriptions, a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to some analog baseband processing unit and/or the processor 804, 814 or other central processing unit. In some embodiments, the wireless transceiver 802, 812, portions of the antenna unit 808, 818, and an analog baseband processing unit may be combined in one or more processing units and/or application specific integrated circuits (ASICs).

The antenna units 808, 818 may be provided to convert between wireless signals and electrical signals, enabling the AP 855 and mobile radio node 850 to send and receive information from a cellular network or flexible spectrum use (FSU) network or some other available wireless communications network or from a peer wireless device. In an embodiment, the antenna units 808, 818 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna units 808, 818 may include antenna tuning and/or impedance matching components, RF power amplifiers, and/or low noise amplifiers.

The processors 804, 814, 824 may be of any type suitable to the local application environment, and may include one or more of general-purpose computers, special-purpose computers, microprocessors, digital signal processors ("DSPs"), field-programmable gate arrays (FPGAs), application-specific integrated circuits (ASICs), and processors based on a multi-core processor architecture, as non-limiting examples.

The processors 804, 814, 824 or some other form of generic central processing unit (CPU) or special-purpose processor such as digital signal processor (DSP), may operate to control the various components of the wireless communication network 800 in accordance with embedded software or firmware stored in memory 806, 816, 826 or stored in memory contained within the processors 804, 814, 824. The processors 804, 814, 824 may include capability to recover timing for determining synchronization between radio nodes. In addition to the embedded software or firmware, the processors 804, 814, 824 may execute other applications or application modules stored in the corresponding memory 806, 816, 826 or made available via wireless network communications. The application software may comprise a compiled set of machine-readable instructions that configures the processors 804, 814, 824 to provide the desired functionality, or the application software may be high-level software instructions to be processed by an interpreter or compiler to indirectly configure the processors 804, 814, 824.

The memory 806, 816, 826 as discussed above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 806, 816, 826 may include program instructions or computer program code that, when executed by an associated processor, enable the communication element to perform tasks as described herein.

The processors 804, 814, based on the received transmission signal by transceivers 802, 812, determine membership of a first and second radio node in a common synchronization group. The processors 804, 814, using the memory 806, 816, based at least in part on the determined membership, adjusts at least one transmission parameter for the wireless transceiver 802, 812.

Without in any way limiting the scope, interpretation, or application of the claims appearing below, a technical effect of one or more of the example embodiments disclosed herein is to determine a radio node as synchronized or unsynchronized based on membership in a common synchronization group. Another technical effect of one or more of the example embodiments disclosed herein is to, disregard sinc leakage into the neighbor's reserved band when shaping the transmit signal if the transmitting radio node and neighboring radio node are determined to be members of a common synchronization group, increasing data rate and improving efficiency of the radio transmission. Another technical effect of one or more of the example embodiments disclosed herein is to take sinc leakage into the neighbor's reserved band into account, when shaping the transmit signal if the transmitting radio node and neighboring radio node are determined not to be members of a common synchronization group and use a lower emission limit, leave guard band and/or lower power at the band edge.

Embodiments of the present invention may be implemented in software, hardware, application logic or a combination of software, hardware and application logic. The software, application logic and/or hardware may reside on user equipment (UE), mobile station, radio node, access point or base station. If desired, part of the software, application logic and/or hardware may reside on user equipment, part of the software, application logic and/or hardware may reside on a radio node, and part of the software, application logic and/or hardware may reside on access point. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 8. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims For example, statements regarding OFDM may also be applicable to SC-FDMA.

What is claimed is:

1. An apparatus, comprising:
a transceiver configured to receive a transmission signal from a radio node; and
a processor configured to:
based on the received transmission signal, determine membership of the apparatus and the radio node in a common synchronization group; and
based at least in part on the determination, adjust at least one transmission parameter to control a level of unwanted emissions into a neighboring radio channel,
wherein determining the membership of the apparatus and the radio node in a common synchronization group comprises determining whether the apparatus and radio node belong to the same group, wherein the group is determined based on an identity of the apparatus and an identity of the radio node.

2. The apparatus according to claim 1, wherein the unwanted emissions are sinc leakage.

3. The apparatus according to claim 1, wherein if the first node and the second node are determined as being members of the common synchronization group, the at least one transmission parameter is adjusted resulting in increasing a level of unwanted emissions.

4. The apparatus according to claim 1, wherein if the first node and the second node are determined as not being members of the common synchronization group, the at least one transmission parameter is adjusted resulting in reducing a level of unwanted emissions.

5. The apparatus according to claim 1, wherein if the first node and second node are determined as not being members of the common synchronization group, the at least one transmission parameter is adjusted to account for sinc leakage.

6. The apparatus according to claim 5, wherein if the first node and the second node are determined as being members of the common synchronization group, the at least one transmission parameter is adjusted without accounting for sinc leakage.

7. The apparatus according to claim 1, wherein determining the membership in the common synchronization group comprises determining whether the first and second nodes are associated with a same access point.

8. The apparatus according to claim 1, wherein the transmission signal comprises a signaled identity and membership in the common synchronization group is determined by comparing the signaled identity against a set of known identities.

9. The apparatus according to claim 8, wherein the set of known identities is configured by a managing entity.

10. The apparatus according claim 1, wherein adjusting the at least one transmission parameter further comprises adjusting at least one of a transmit power, a guard band width, cancellation subcarriers, windowing, filtering, means to improve waveform continuity between adjacent symbols and a spectral shape of the transmission signal.

11. The apparatus according to claim 1, wherein adjusting the at least one transmission parameter further comprises deferring from transmitting on a first radio resource when the first node and the second node are determined as not belonging to the common synchronization group.

12. An apparatus, comprising:
a transceiver configured to receive a transmission signal from a radio node; and
a processor configured to:
based on the received transmission signal, determine membership of the apparatus and the radio node in a common synchronization group; and
based at least in part on the determination, adjust at least one transmission parameter to control a level of unwanted emissions into a neighboring radio channel
wherein adjusting the at least one transmission parameter further comprises deferring from transmitting on a first radio resource when the first node and second node are determined as not being members of the common synchronization group with the second node using a second radio resource, and
wherein the second radio resource occupies a frequency band adjacent to or separated by a guard band from a frequency band of the first radio resource.

13. A method, comprising:
at a first node, receiving a transmission signal from a second node;
based on the received transmission signal, determining membership of the first and second nodes in a common synchronization group; and
based at least in part on the determination, adjusting at least one transmission parameter to control a level of unwanted emissions into a neighboring radio channel,
wherein determining the membership of the first and second nodes in a common synchronization group comprises determining whether the first and second nodes belong to the same group, wherein the group is determined based on an identity of the first node and an identity of the second node.

14. The method according to claim 13, wherein the unwanted emissions are sinc leakage.

15. The method according claim 13, wherein if the first node and the second node are determined as being members of the common synchronization group, the at least one transmission parameter is adjusted resulting in increasing a level of unwanted emissions.

16. The method according claim 13, wherein if the first node and the second node are determined as not being members of the common synchronization group, the at least one transmission parameter is adjusted resulting in reducing a level of unwanted emissions.

17. The method according to claim 13, wherein if the first node and second node are determined as not being members of the common synchronization group, the at least one transmission parameter is adjusted to account for smc leakage.

18. The method according to claim 17, wherein if the first node and the second node are determined as being members of the common synchronization group, the at least one transmission parameter is adjusted without accounting for sinc leakage.

* * * * *